United States Patent [19]
Hoffman, Jr. et al.

[11] Patent Number: 6,096,207
[45] Date of Patent: Aug. 1, 2000

[54] FILTER CARTRIDGE ASSEMBLY HAVING A REUSABLE SUPPORT CORE STRUCTURE

[75] Inventors: Charles S. Hoffman, Jr., Baltimore; Norman F. Robillard, Whitehall; Robert H. Sumner, Street, all of Md.

[73] Assignee: USF Filtration and Separations Group Inc., Timonium, Md.

[21] Appl. No.: 09/154,522

[22] Filed: Sep. 16, 1998

Related U.S. Application Data

[63] Continuation-in-part of application No. 09/046,554, Mar. 24, 1998, abandoned.

[51] Int. Cl.[7] ............................. B01D 29/21; B01D 29/96
[52] U.S. Cl. ........................ 210/232; 210/243; 210/461; 210/489; 210/493.2; 210/497.01; 55/498; 55/502; 55/521
[58] Field of Search ..................................... 210/232, 238, 210/450, 488, 489, 493.1, 493.2, 493.5, 497.01, 497.2, DIG. 17, 459, 461, 462; 55/497, 498, 500, 502, 521

[56] References Cited

U.S. PATENT DOCUMENTS

| | | |
|---|---|---|
| 740,381 | 9/1903 | Hasenpflug . |
| 768,951 | 8/1904 | Rawson . |
| 2,726,184 | 12/1955 | Cox et al. . |
| 2,771,156 | 11/1956 | Kasten et al. . |
| 3,186,552 | 6/1965 | Cutler . |
| 3,218,785 | 11/1965 | Tietz . |
| 3,497,070 | 2/1970 | Parkinson et al. . |
| 3,850,813 | 11/1974 | Pall et al. . |
| 4,218,324 | 8/1980 | Hartmann et al. . |
| 4,646,600 | 3/1987 | Filippi . |
| 4,855,047 | 8/1989 | Firth . |
| 5,015,375 | 5/1991 | Fleck . |
| 5,211,846 | 5/1993 | Kott et al. . |
| 5,223,136 | 6/1993 | Gilbert . |
| 5,238,717 | 8/1993 | Boylan . |
| 5,250,179 | 10/1993 | Spearman . |
| 5,290,442 | 3/1994 | Clack . |
| 5,399,264 | 3/1995 | Pulek et al. . |
| 5,472,606 | 12/1995 | Steere et al. . |
| 5,476,585 | 12/1995 | Mills . |

(List continued on next page.)

FOREIGN PATENT DOCUMENTS

| | | |
|---|---|---|
| 0 090 383 | 10/1983 | European Pat. Off. . |
| 1569913 | 6/1969 | France . |

OTHER PUBLICATIONS

"The Future of Filtration", Brochure COR–405, Porous Media Corporation, St. Paul, MN (1994).
"Genesis(tm) Coreless Cartridges", Brochure GEN–405, Porous Media Corporation, St. Paul, MN (1994).

*Primary Examiner*—W. L. Walker
*Assistant Examiner*—Richard W. Ward
*Attorney, Agent, or Firm*—Nixon & Vanderhye P.C.

[57] ABSTRACT

A filter cartridge assembly includes a filter cartridge having a generally cylindrical filter medium which defines a cylindrically shaped core space, and a pair of end caps fixed to opposite ends of the filter medium. Most preferably, the filter cartridge is "coreless" in that it is not provided with an integral support core structure. At least one of the end caps (e.g., the proximal end cap) is annular and has an interior cylindrical surface defining an interior space in alignment with the core space. A truncated generally conically shaped seal skirt is operatively associated with the annular end caps. The filter cartridge is sleeved over reusable support core structure which includes a base having a truncated conically shaped seal skirt, and a tubular perforated rigid core element fixed at one end to the base. The annular end-cap and the base of the support core structure are removably mechanically coupled to one another, most preferably by being threadably interconnected. In such a manner, the seal skirt is sealingly engaged with the seal skirt of the base. The base of the support core structure most preferably is provided with a protruding seat boss which carries seal rings (e.g., conventional O-rings). The seat boss is thereby adapted to being removably, but sealingly, seated within an internal seat cup structure of a conventional filter housing.

26 Claims, 7 Drawing Sheets

U.S. PATENT DOCUMENTS

| | | |
|---|---|---|
| 5,605,625 | 2/1997 | Mills . |
| 5,643,444 | 7/1997 | Garrigues et al. . |
| 5,681,461 | 10/1997 | Gullett et al. . |
| 5,681,469 | 10/1997 | Barboza et al. . |
| 5,753,117 | 5/1998 | Jiang . |
| 5,803,941 | 9/1998 | Berkhoel et al. . |
| 5,846,416 | 12/1998 | Gullett . |
| 5,984,109 | 11/1999 | Kanwar et al. .......................... 210/440 |

FILTER CARTRIDGE ASSEMBLY HAVING A REUSABLE SUPPORT CORE STRUCTURE

CROSS-REFERENCE TO RELATED APPLICATION

This application is a continuation-in-part of now abandoned, U.S. patent application Ser. No. 09/046,554 filed on Mar. 24, 1998 now abandoned (the entire content of which is expressly incorporated hereinto by reference).

FIELD OF THE INVENTION

The present invention relates generally to the field of filter cartridges. In preferred forms, the present invention relates to filter cartridge assemblies having a reusable support core structure which may be removably accommodated within a filter housing, and a disposable coreless filter cartridge which is capable of being sleeved over the support core structure.

BACKGROUND AND SUMMARY OF THE INVENTION

Disposable filter cartridges are widely used for the filtration of a variety of fluids. Generally, such filter cartridges include a cylindrically shaped filter medium which define a central core chamber. The filter medium is typically provided with appropriate end caps which allow fluid to be forced through the depth of the filter media. Some filter cartridges (e.g., as depicted in FIG. 4 of U.S. Pat. No. 5,681,469) are provided with an integral rigid core structure which provides the filter media with structural support (e.g., so the filter medium is capable of withstanding fluid pressure differentials during use). Other filter cartridges, as shown, for example, in U.S. Pat. No. 5,399,264, employ a relatively rigid, self-supporting, porous, thick-walled tubular filter cartridge element having specially designed flexible end caps. Still other filter cartridges, such as those depicted in U.S. Pat. Nos. 4,218,324 and 5,681,461 employ a "coreless" disposable filter cartridge having rigid preformed end caps which is sleeved over, and fluid-sealed with respect to, a reusable separate core structure. The present invention is related to this latter type of filter cartridge assemblies.

Broadly, the present invention includes a filter cartridge assemblies having a coreless disposable filter cartridge which is sleeved over a reusable separate rigid core structure. More specifically, the preferred filter cartridge assembly of this invention includes a filter cartridge having a generally cylindrical filter medium which defines a cylindrically shaped core space, and a pair of rigid, preformed end caps fixed to opposite ends of the filter medium. Most preferably, the filter cartridge is "coreless" in that it is not provided with an integral support core structure. At least one of the end caps (e.g., the proximal end cap) is annular and has an interior cylindrical surface defining an interior space in alignment with the filter cartridge's core space. A truncated generally conically shaped seal skirt is operatively associated with the annular end cap.

The filter cartridge is sleeved over a reusable support core structure which includes a base having a truncated conically shaped seal skirt, and a tubular perforated rigid core element fixed at one end to the base. The annular end-cap and the base of the support core structure are removably mechanically coupled to one another, most preferably by being threadably interconnected. In such a manner, the seal skirt is sealingly engaged with the seal skirt of the base.

The base of the support core structure most preferably is provided with a protruding seat boss which carries seal rings (e.g., conventional O-rings). The seat boss is thereby adapted to being removably, but sealingly, seated within an internal seat cup structure of a conventional filter housing.

These and other aspects and advantages of the present invention will become more clear after careful consideration is given to the following detailed description of the preferred exemplary embodiments thereof which follow.

BRIEF DESCRIPTION OF THE ACCOMPANYING DRAWINGS

Reference will hereinafter be made to the accompanying drawings wherein like reference numerals throughout the various FIGURES denote like structural elements, and wherein, FIG. 1 is an exploded perspective view of a coreless filter cartridge assembly in accordance with the present invention;

DETAILED DESCRIPTION OF THE INVENTION

Figure 1:
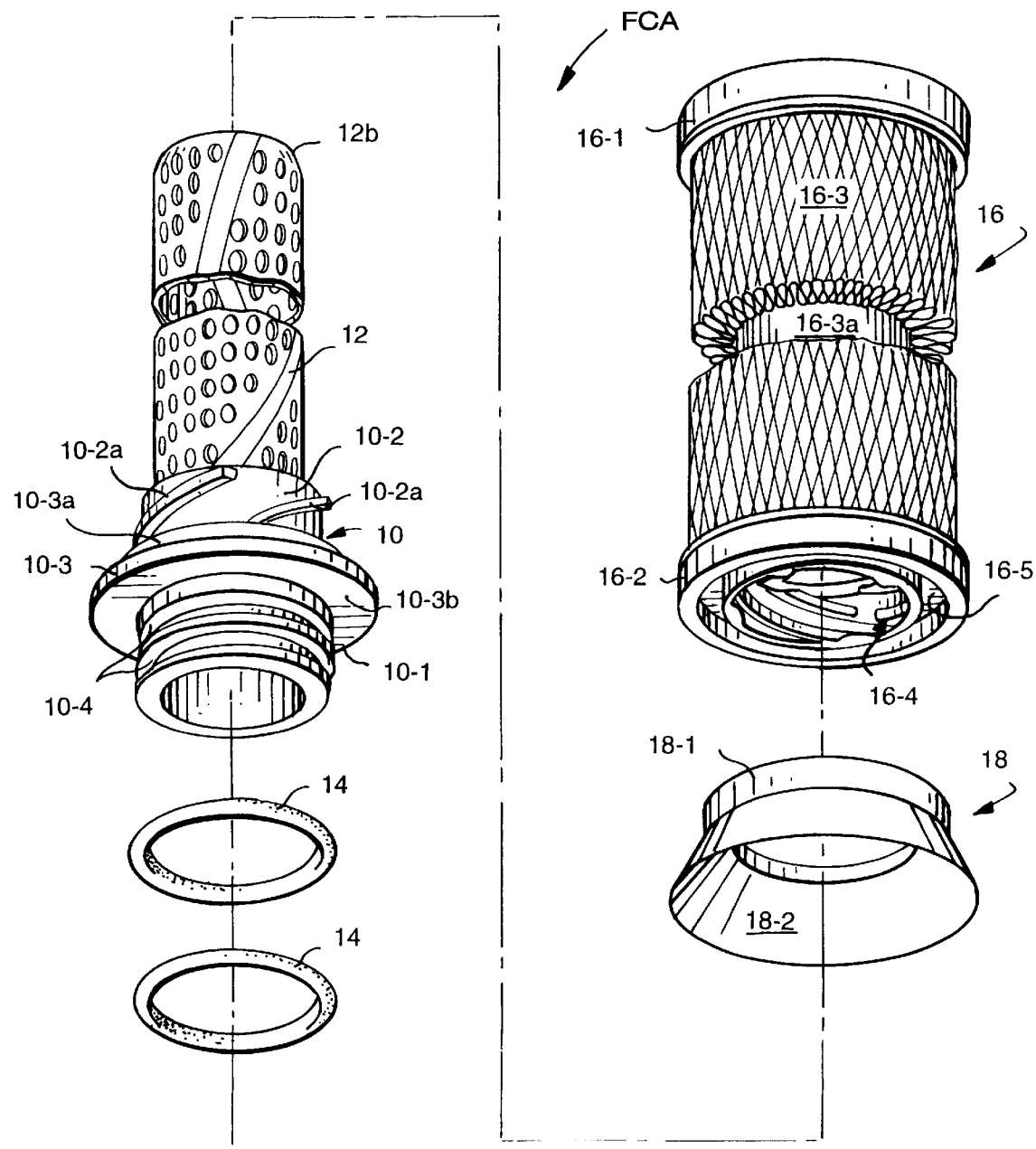
Figure 2:
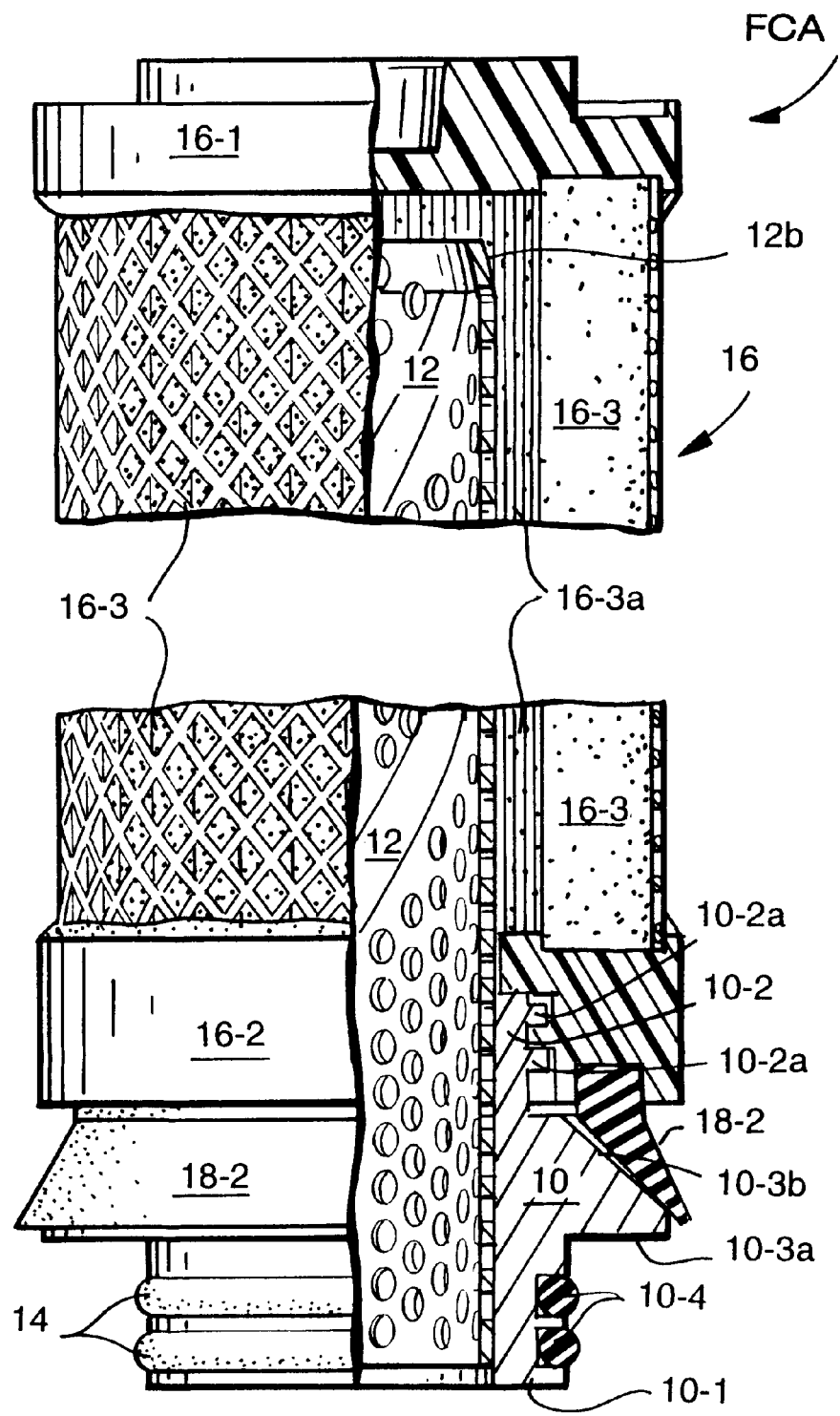
FIG. 2 is an elevational view, partly in section, of an assembled coreless filter cartridge assembly in accordance with the present invention.
Figure 3:
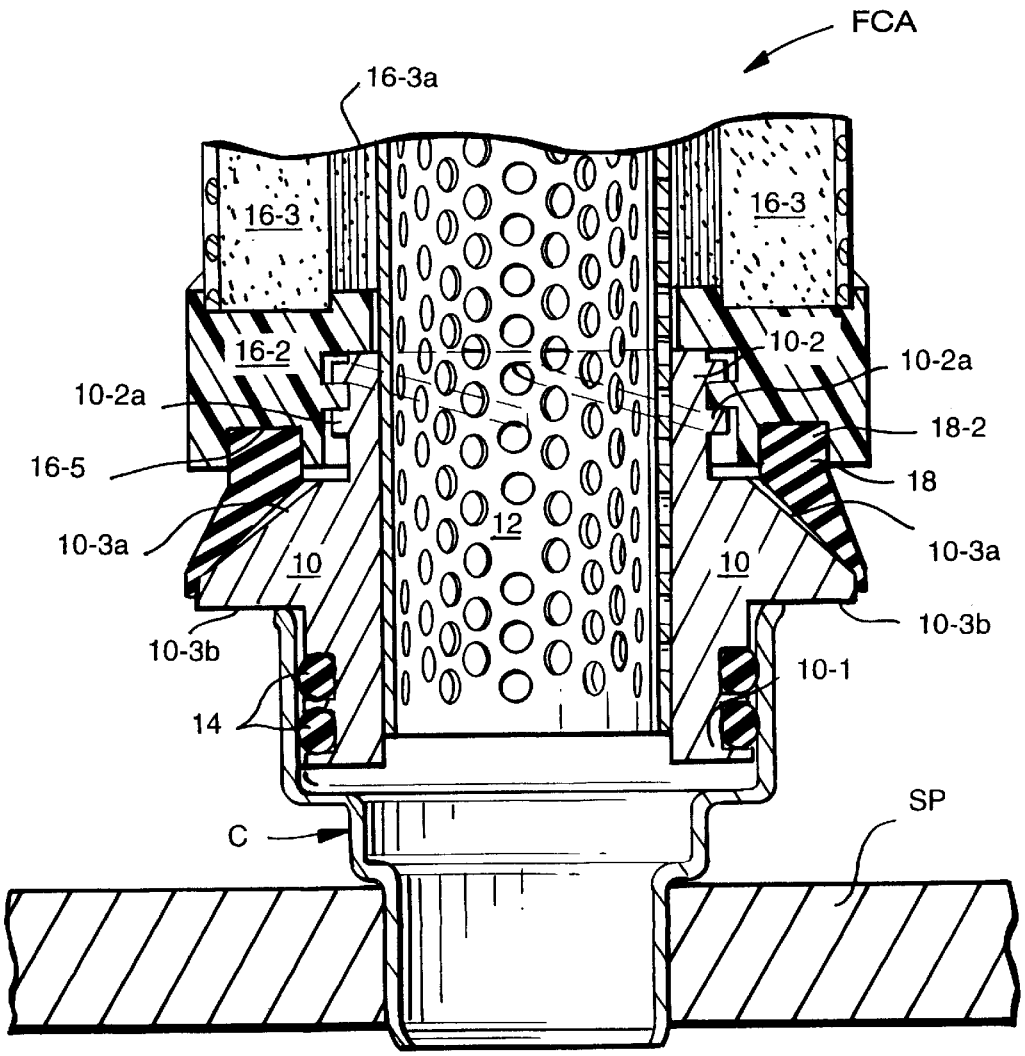
FIG. 3 is an enlarged cross-sectional elevational view showing the filter cartridge assembly in accordance with the present invention mounted in a filter housing.

The filter cartridge assembly FCA in accordance with the present invention is depicted in greater detail in accompanying FIGS. 1–3. In this regard, the filter cartridge assembly FCA generally includes a rigid metal base member 10 to which one end of an elongate perforated tubular metal core 12 is rigidly attached (e.g., via soldering, welding or the like). A cylindrical filter cartridge 16 may be sleeved over the tubular core 12 and threadably coupled to the base 10 in a manner to be described below.

The tubular metal core 12 is most preferably made by helically winding a perforated metal sheet and rigidly joining the abutted or overlapped edges (e.g., via soldering, welding or the like) to form a rigid tubular structure of indefinite length. The tubular structure may then be cut to desired lengths. In this regard, the other end of the tubular core 12 opposite to the end joined to the base 10 is most preferably provided with a slightly inwardly rounded or chamfered edge region 12b to more easily allow filter cartridges to be sleeved thereover during use.

Figure 4B:
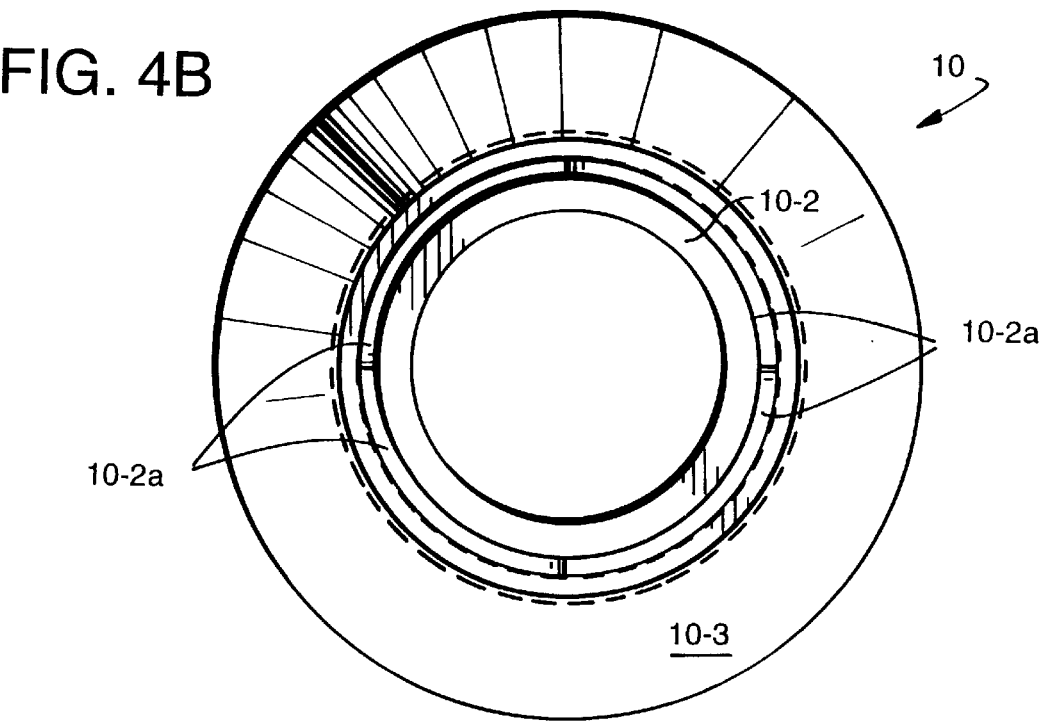
FIG. 4B is a top plan view of the core base as taken along lines 4B—4B in FIG. 4A.
Figure 4A:
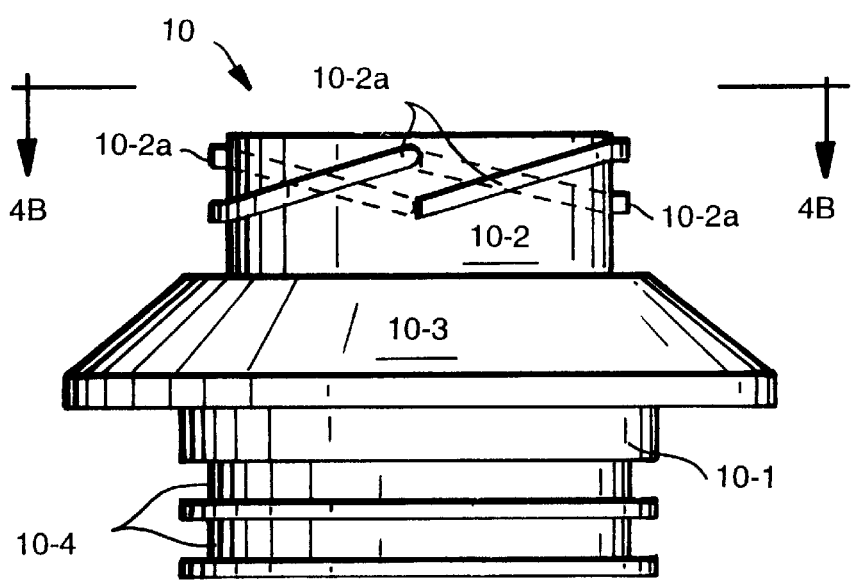
FIG. 4A is an elevational view of the reusable core base that is employed in the filter cartridge assembly of this invention.

As is perhaps better shown in FIGS. 4A and 4B, the base 10 is integrally provided with a seat boss 10-1 at one end, a threaded connection boss 10-2 at the other end, and a concentrically disposed seal flange 10-3 disposed therebetween.

The seat boss 10-1 is provided with a pair of concentric external recesses 10-4 each of which is adapted to receive a respective one of the elastomeric O-ring seals 14 (see FIGS. 1–3). The seat boss 10-1, along with the O-ring seals 14 seated in the recesses 104, are thus collectively adapted to being sealingly received within a seat cup C which is rigidly fixed to a separator plate SP of a conventional filter cartridge housing unit (not shown) so as to prevent fluid leakage therefrom.

The connection boss 10-2 is provided with discontinuous threads 10-2*a* which serve to provide a one-quarter turn coupling between the filter cartridge 16 (see FIGS. 1–3) and the base 10 in a manner which will be described in greater detail below. The seat flange 10-3, on the other hand, defines a planar annular lower surface 10-3*a* and a truncated, conically-shaped upper surface 10-3*b*, the purpose of which will also be described in greater detail below.

Referring again to FIGS. 1–3, the filter cartridge 16 includes a pair of preformed rigid end-caps 16-1, 16-2 positionally holding therebetween a cylindrically shaped, tubular filter body 16-3 which, in the preferred form, is a conventional pleated filter medium. Other filter media may also be employed, such as filter media formed of a non-woven melt-spun fibrous mass and/or sheets, foam or other porous filter media and the like. The distal end-cap 16-1 is most preferably solid (i.e., non-apertured) so that fluid passing through the filter body 16-3 will be directed into the central hollow bore 16-3*a* thereof. The proximal end-cap 16-2, on the other hand, defines a threaded bore 16-4 in coaxial alignment with the central bore 16-3*a* of the filter body 16-3.

The threaded bore 16-4 of end-cap 16-2 is adapted to threadably mate with the threads 10-2*a* of threaded boss 10-2. Thus, the filter cartridge 16 may be physically sleeved over the metal core 12 to allow the threaded boss 10-2 and the threaded bore 16-4 of the end cap 16-2 to mate with one another by relative turning motion therebetween. In this regard, the mated threads of the boss 10-2 and bore 16-4 are most preferably such to allow approximately one-quarter turn coupling. That is, seated coupling of the threaded bore 164 and the boss 10-2 is accomplished with only about one-quarter (i.e., about 90°) relative turning movement or rotation therebetween.

Figure 5B:
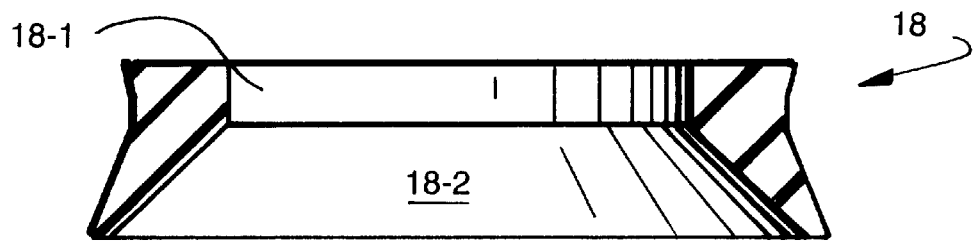
FIG. 5B is a cross-sectional elevational view of the seal depicted in FIG. 5A as taken along line 5B—5B therein.
Figure 5A:
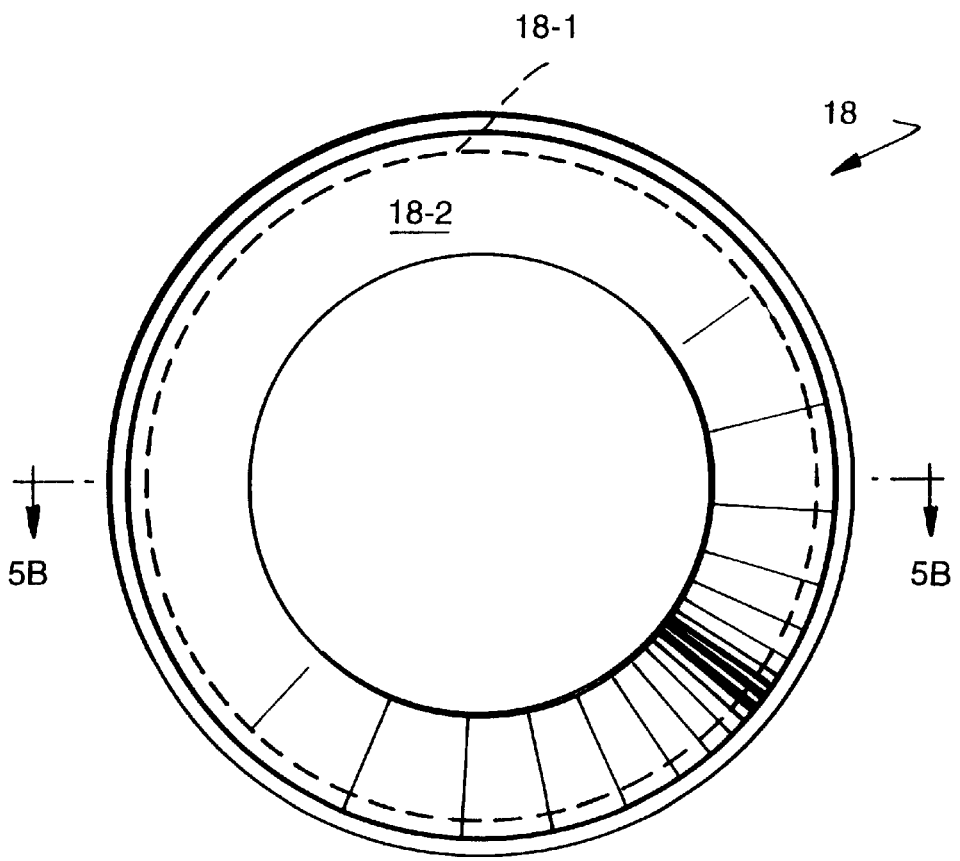
FIG. 5A is a bottom plan view of the annular seal employed in the filter cartridge assembly of this invention.

The proximal end-cap 16-2 carries a flexible seal skirt 18 which is most preferably formed as a one-piece unit to include connection and sealing flanges 18-1 and 18-2, respectively, as is perhaps more clearly depicted in accompanying FIGS. 5A and 5B. Specifically, the seal skirt 18 includes an upwardly protruding circularly shaped connection flange 18-1 which seats within the annular groove 16-5 of the proximal end cap 16-2. A generally truncated conically shaped seal flange 18-2 extends in an opposite direction outwardly away from the connection flange 18-1. The seal flange 18-2 is formed of an elastomeric material, e.g., a synthetic rubber or like material, which is compatible with the filtering conditions and fluid.

In use, the combined base 10 and central support core 12 is pre-positioned within the filter cartridge housing unit (i.e., such that the seat boss 10-1 is seated within the seat cup C thereof). That is, the base 10 and support core 12 are initially inserted in position as a unit into, or are already positioned within, the housing unit without the cartridge 16 being sleeved thereover. The cartridge 16 is thereafter sleeved over the pre-positioned central support core 12 so as to present the threads 10-2*a* of the threaded connection boss 10-2 to the threaded interior surface 16-4 of proximal end cap 16-2. Relative turning movement between the cartridge 16 and threaded boss 10-2 will thus removably couple the cartridge 16 and the base 10. This relative turning movement, as noted previously, is most preferably about a one-quarter turn for ease of use. As will be appreciated, the sealing flange 18-2 will thus be forced downwardly by virtue of the threaded connection between the end-cap 16-2 of the cartridge 16 and the threaded boss 10-2 of the base 10. The sealing flange 18-2 will thereby compressibly bear against the conformably shaped seal skirt 10-3 of the base 10.

Additional sealing pressure will be provided during use by virtue of the fluid being filtered. That is, during use, the fluid being filtered will be introduced into the interior space filter housing by an inlet conduit (not shown) and will flow in a direction from the exterior of the filter cartridge (the high pressure side) to the interior space 16-3*a* of the filter cartridge (the low pressure side). This pressure differential, and the conformable conical shapes of the sealing flange 18-2 and the seal skirt 10-3, will thus ensure a positive seal therebetween.

Although threaded interconnection between the end-cap 16-2 and the boss 10-2 has been described above as a particularly preferred technique to mechanically couple the cartridge 16 to the base 10, other equivalent mechanical coupling techniques may be employed in accordance with the present invention. Thus, the end-cap 16-2 and boss 10-2 may be provided with a cooperating quarter-turn bayonet locking system. Alternatively, a spring collet coupling system (e.g., where one structural element has one or more spring fingers which are capable of seating within cooperating recess(es) of the other structural element) or a snap-fit coupling system (e.g., where one structural element has a protruding friction member which is capable of seating within cooperating recess(es) of the other structural element) may also be employed. Important to the present invention is that the one-quarter turn coupling system that is employed forcibly engages the sealing flange 18-2 and the conformably shaped seal skirt 10-3 to effect a fluid-tight seal therebetween.

Figure 6:
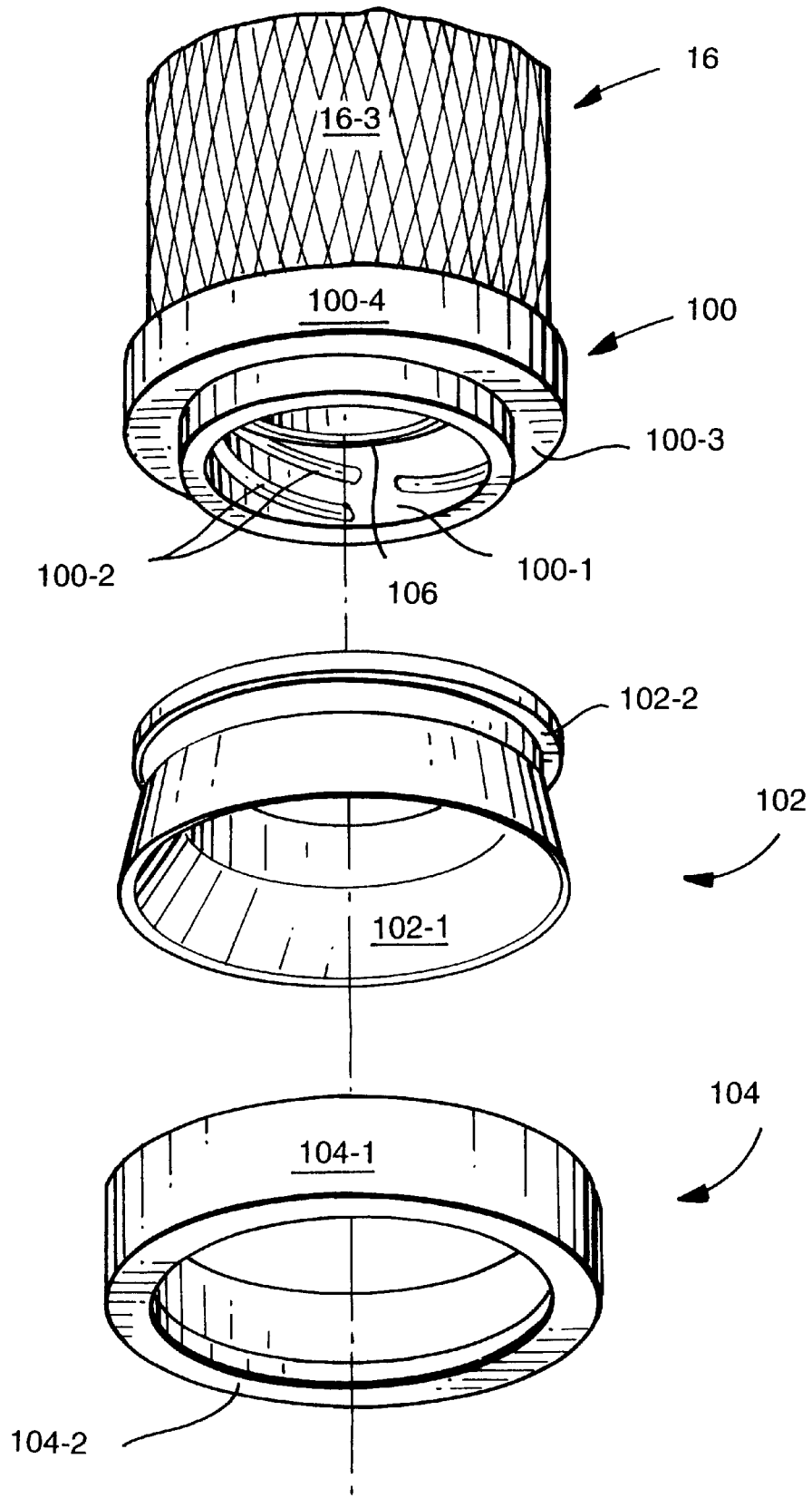
FIG. 6 is a perspective view of another embodiment of a filter cartridge and seal assembly that may be employed in the present invention.
Figure 7:
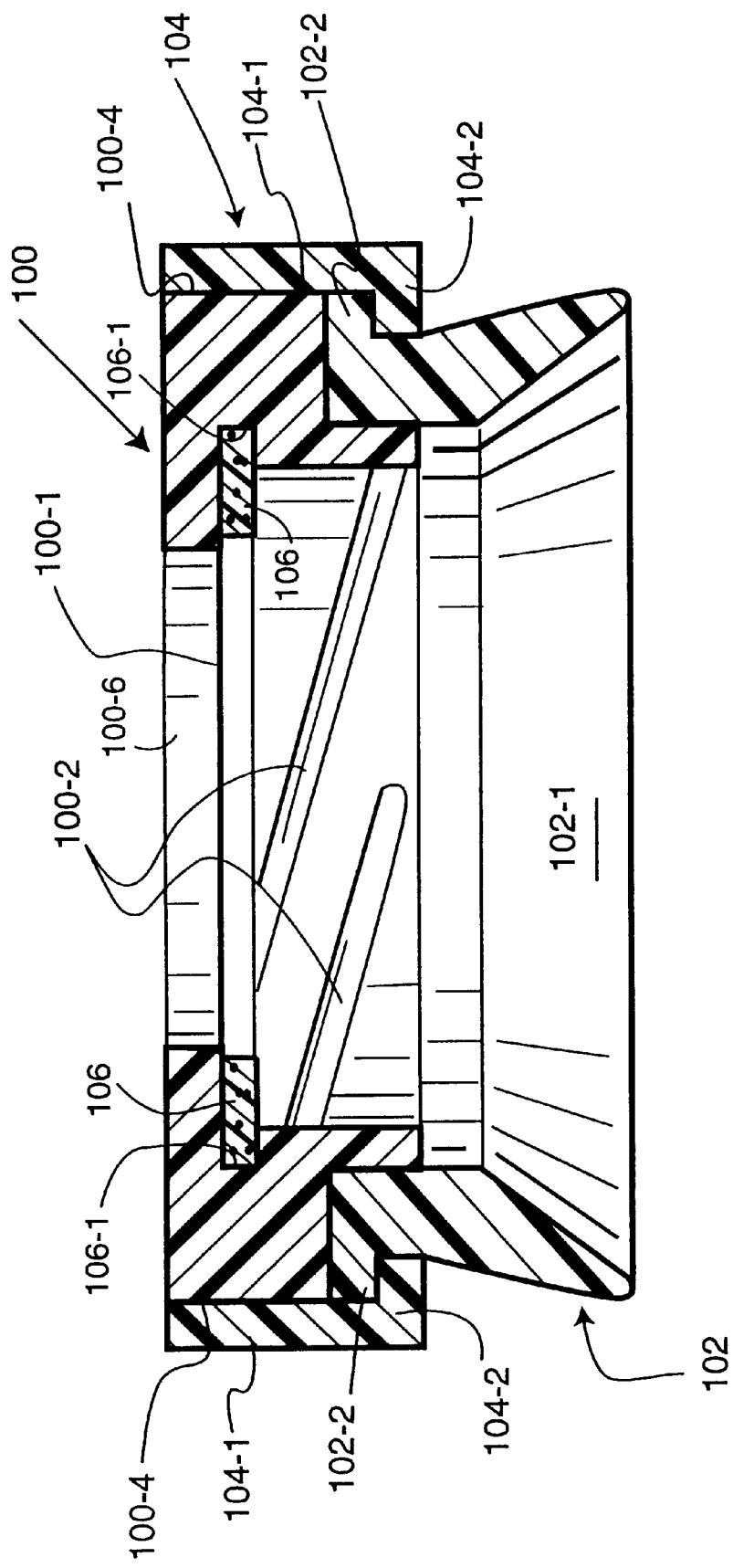
FIG. 7 is an enlarged cross-sectional elevational view of the filter cartridge and seal assembly depicted in FIG. 6.

Accompanying FIGS. 6 and 7 show an alternative cartridge end-cap 100 and seal 102 assembly that may be employed in the practice of this invention. Specifically, like the end-cap 16-2 discussed previously, the end-cap 100 shown in FIGS. 6 and 7 has a cylindrical interior surface 100-1 provided with threads 100-2 which are adapted to being threadably coupled to the base 10. Other coupling structures could likewise be employed, as was noted previously. The end-cap 100 is provided with an annular recessed ledge surface 100-3 in surrounding relationship to the central threaded interior surface 100-1 and positioned below the exterior side surface 100-4.

The flexible elastomeric seal 102 includes a depending truncated cylindrically shaped seal flange 102-1 which is conformably shaped to the cylindrical seal skirt 10-3 of the base 10. An annular connection lip 102-2 extends outwardly away from the seal flange 102-1 and is most preferably formed as a unitary structure therewith. The connection lip 102-2 is sized so as to be seated within the annular ledge surface 100-3 of the end-cap 100.

An annular retaining ring 104 is provided so as to be in close conformity with the exterior side surface 100-4 of the end-cap 100 and thus be in friction fit relationship therewith. As shown, the retaining ring 104 has an interior wall 104-1 which is friction fit over the exterior surface of the end-cap 100, and an inwardly projecting retaining wall 104-2. The retaining wall 104-2 of the retaining ring 104 will thus removably retain the connection lip 102-2 within the ledge surface 100-3.

An elastomeric flat gasket 106 formed of a suitable elastomeric material has an outer annular region seated within an annular groove 106-1 formed in the end-cap 100. The inner region of the gasket 106 terminates in a circular edge which does not extend beyond (and most preferably as shown in FIG. 7 is slightly recessed from) the opening 100-6 defined by the end-cap 100. In use, therefore, the upper edge 10-2*b* of the connection boss 10-2 (see FIG. 4A) is pressed into the gasket 106 when the end cap 100 is threadably coupled thereto in the manner described previously. This pressure between the upper edge 10-2*b* of the connection boss 10-2 and the gasket 106 thereby serves to provide a fluid-tight seal at the upper end of the sealing boss 10-2.

The cartridge end-cap 100 and seal assembly 102 depicted in accompanying FIGS. 6 and 7 are particularly useful for end-use applications where the filter cartridge may be subjected to back-washing operations—that is, where the fluid flow direction is generally radially outwardly from the core toward the filter cartridge's exterior surface. While the conical seal flange 102-1 is "pressure energized" during normal (forward) fluid flow in the manner that was described previously, it may be unseated during reverse fluid flow associated with back-washing operations causing fluid bypass. Thus, the seal provided by the gasket 106 prevents the possibility that the fluid will bypass the seal assembly 102 during back-washing operations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A filter cartridge assembly comprising:
    a filter cartridge having a generally cylindrical filter medium which defines a cylindrically shaped core space, and a pair of end caps fixed to opposite ends of said filter medium,
    at least one of said end caps being annular and having an interior cylindrical surface defining an interior space in alignment with said core space;
    a truncated generally conically shaped seal skirt operatively associated with said at least one of said end caps; and
    a reusable support core structure which includes,
       (a) a base which integrally includes (i) a seat boss at one end thereof, (ii) a connection boss at another end thereof, and (iii) a seal flange concentrically disposed between said seat and connection bosses and defining a truncated conical seal surface which is conformably shaped to said conically shaped seal skirt, and
       (b) a tubular perforated rigid core element fixed to and extending outwardly from said connection boss at said another end of said base, wherein
    said filter cartridge is sleeved over said rigid core element such that said at least one of said end caps is removably mechanically coupled to said base of said support core assembly, whereby said seal skirt is sealingly engaged with said conically shaped seal surface.

2. A filter cartridge assembly as in claim 1, wherein said seat boss extends downwardly from said seal flange.

3. A filter cartridge assembly as in claim 2, wherein said seat boss includes at least one annular groove, and an O-ring seal seated in said groove.

4. A filter cartridge assembly as in claim 2, wherein said seat boss includes a pair of longitudinally separated annular grooves, and a pair of O-ring seals each seated in a respective one of said grooves.

5. A filter cartridge assembly as in claim 1, wherein said at least one end-cap and said base are threadably coupled to one another.

6. A filter cartridge assembly as in claim 5, wherein said connection boss is threaded and extends upwardly from said seal flange, and wherein said interior surface of said at least one end-cap includes threads which are threadably coupled to said threaded connection boss.

7. A filter cartridge assembly as in claim 1, wherein said at least one end-cap includes an annular recess, and wherein said seal skirt includes an upwardly extending connection flange which is seated within said annular recess.

8. A filter cartridge assembly as in claim 1, wherein said at least one end-cap includes an annular ledge, and wherein said seal skirt includes an outwardly extending connection lip which is seated on said ledge.

9. A filter cartridge assembly as in claim 8, further comprising a retaining ring which is coupled to said at least one end-cap for retaining said connection lip on said ledge.

10. A filter cartridge assembly as in claim 9, wherein said retaining ring has an L-shaped cross-section and is frictionally engaged with said at least one end-cap.

11. A filter cartridge assembly as in claim 1, wherein said at least one end cap includes an annular elastomeric flat gasket which is concentrically positioned with respect to said interior cylindrical surface.

12. A filter cartridge assembly as in claim 11, wherein said at least one end cap includes an annular groove, wherein an outer annular region of said flat gasket is seated within said annular groove.

13. A filter cartridge assembly as in claim 12, wherein said flat gasket has an inner annular region, and wherein said connection boss has an upper edge in sealing contact with said inner annular region of said flat gasket.

14. A fluid-filtration assembly comprising a filter housing having a seat cup, and a filter cartridge assembly removably coupled to said seat cup within said housing, wherein said filter cartridge assembly comprises:
    a filter cartridge having a generally cylindrical filter medium which defines a cylindrically shaped core space, and a pair of end caps fixed to opposite ends of said filter medium,
    at least one of said end caps being annular and having an interior cylindrical surface defining an interior space in alignment with said core space;
    a truncated generally conically shaped seal skirt operatively associated with said at least one of said end caps; and
    a reusable support core structure which includes,
       (a) a base which integrally includes (i) a seat boss at one end thereof, (ii) a connection boss at another end thereof, and (iii) a seal flange concentrically disposed between said seat and connection bosses and defining a truncated conical seal surface which is conformably shaped to said conically shaped seal skirt, and
       (b) a tubular perforated rigid core element fixed to and extending outwardly from said connection boss at said another end of said base, wherein
    said filter cartridge is sleeved over said rigid core element such that said at least one of said end caps is adjacent said connection boss of said base, and wherein said connection boss and said at least one end cap include coupling means for removably mechanically coupling said connection boss of said base and said at least one end cap to one another and thereby cause said seal skirt to be sealingly engaged with said conical seal surface.

15. A fluid-filtration assembly as in claim 14, wherein said seat boss extends downwardly from said seal flange.

16. A fluid-filtration assembly as in claim 15, wherein said seat boss includes at least one annular groove, and an O-ring seal seated in said groove.

17. A fluid-filtration assembly as in claim 15, wherein said seat boss includes a pair of longitudinally separated annular grooves, and a pair of O-ring seals each seated in a respective one of said grooves.

18. A fluid-filtration assembly as in claim 14, wherein said at least one end-cap and said base are threadably coupled to one another.

19. A fluid-filtration assembly as in claim 14, wherein said connection boss is threaded and extends upwardly from said seal flange, and wherein said interior surface of said at least one end-cap includes threads which are threadably coupled to said threaded connection boss.

20. A fluid-filtration assembly as in claim 14, wherein said at least one end-cap includes an annular recess, and wherein said seal skirt includes an upwardly extending connection flange which is seated within said annular recess.

21. A fluid-filtration assembly as in claim 14, wherein said at least one end-cap includes an annular ledge, and wherein said seal skirt includes an outwardly extending connection lip which is seated on said ledge.

22. A fluid-filtration assembly as in claim 21, further comprising a retaining ring which is coupled to said at least one end-cap for retaining said connection lip on said ledge.

23. A fluid-filtration assembly as in claim 22, wherein said retaining ring has an L-shaped cross-section and is frictionally engaged with said at least one end-cap.

24. A fluid-filtration assembly as in claim 14, wherein said at least one end cap includes an annular elastomeric flat gasket which is concentrically positioned with respect to said interior cylindrical surface and forms a fluid-tight seal with an upper edge of said base.

25. A fluid-filtration assembly as in claim 24, wherein said at least one end cap includes an annular groove, wherein an outer annular region of said flat gasket is seated within said annular groove.

26. A fluid filtration assembly as in claim 25, wherein said flat gasket has an inner annular region, and wherein said connection boss has an upper edge in sealing contact with said inner annular region of said flat gasket.

* * * * *